United States Patent
Wendt et al.

[11] Patent Number: 6,016,997
[45] Date of Patent: Jan. 25, 2000

[54] METHOD AND DEVICE FOR COUPLING ESPECIALLY A LANDED FLYING APPLIANCE TO A POSITIONING DEVICE

[75] Inventors: Heiner Wendt, Ganderkesee; Ernst-Peter Gross, Bremerhaven, both of Germany

[73] Assignee: MBB Forder - Und Hebesysteme GmbH, Ganderkesee, Germany

[21] Appl. No.: 08/958,927

[22] Filed: Oct. 28, 1997

[30] Foreign Application Priority Data

Oct. 29, 1996 [DE] Germany ............ 196 44 857

[51] Int. Cl.$^7$ ............................ B64F 1/12
[52] U.S. Cl. ........................ 244/115; 244/161
[58] Field of Search .................. 244/161, 115, 244/116, 50

[56] References Cited

U.S. PATENT DOCUMENTS

| | | | |
|---|---|---|---|
| 3,666,216 | 5/1972 | Nagu et al. | 244/161 |
| 3,830,452 | 8/1974 | Seay | 244/116 |
| 4,057,158 | 11/1977 | Lissy | 244/50 |
| 4,123,020 | 10/1978 | Korsak | 244/116 |
| 4,260,187 | 4/1981 | Bejczy | 244/161 |
| 4,295,740 | 10/1981 | Sturges, Jr. | |
| 4,395,005 | 7/1983 | Ganssle | 244/161 |
| 4,431,333 | 2/1984 | Chandler | 244/161 |
| 4,588,150 | 5/1986 | Bock et al. | |
| 5,123,615 | 6/1992 | Wagner et al. | |
| 5,664,743 | 9/1997 | Ortelli | 244/116 |

FOREIGN PATENT DOCUMENTS

| | | |
|---|---|---|
| 219664 | 4/1987 | European Pat. Off. . |
| 661207 | 5/1995 | European Pat. Off. . |
| 709287 | 10/1995 | European Pat. Off. . |
| 2304177 | 8/1974 | Germany . |
| 2514847 | 10/1975 | Germany . |
| 19518454 | 11/1996 | Germany . |

*Primary Examiner*—Galen L. Barefoot
*Attorney, Agent, or Firm*—Sughrue, Mion, Zinn, Macpeak & Seas, PLLC

[57] ABSTRACT

Coupling a landed helicopter to a positioning device, on a ship deck, for example, has up to now been carried out by an operator in such a way that the operator manually operates a grasping means (18), engaging with a longitudinal side of the helicopter, and stops it. The coupling device and method according to the invention use an optical device (30) on at least on grasping mechanism (18) and a reflection means, corresponding to an optical device on the helicopter. The optical device (30) locates the helicopter regardless of the helicopter's landing position, and moves the grasping mechanism (18) by means of corresponding control systems in simple fashion to an exact coupling position without any need for intervention by an operator.

22 Claims, 5 Drawing Sheets

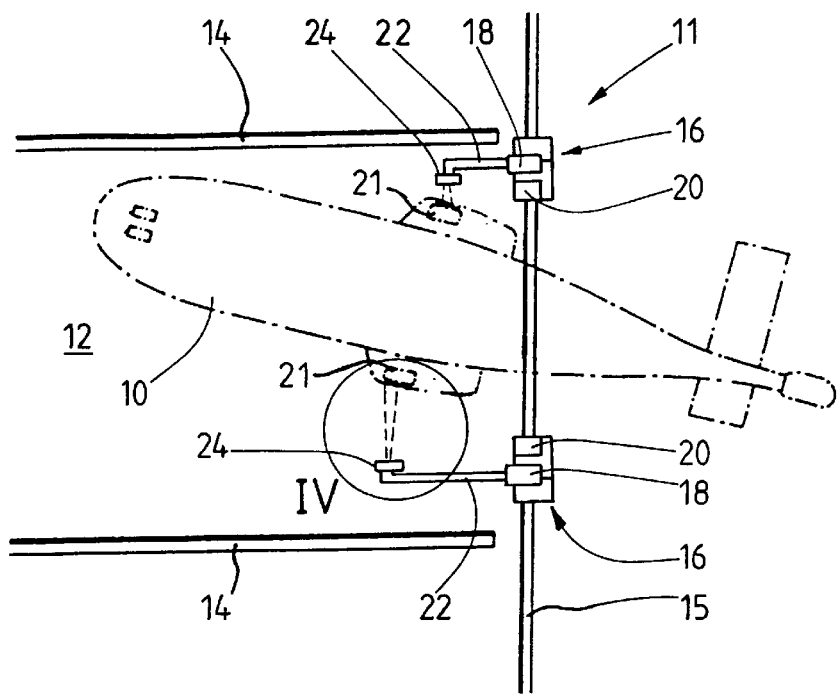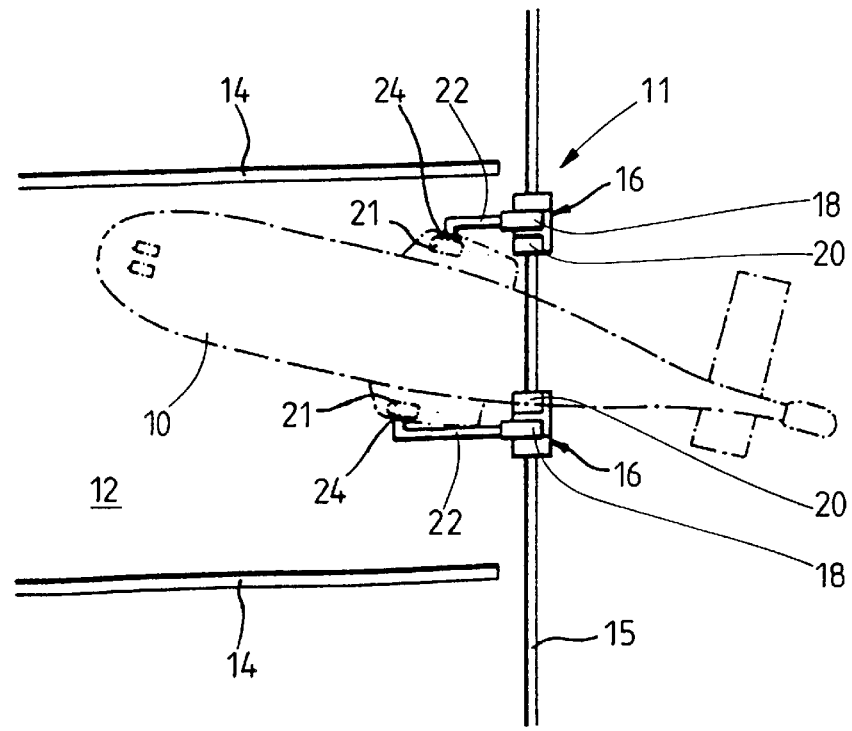

METHOD AND DEVICE FOR COUPLING ESPECIALLY A LANDED FLYING APPLIANCE TO A POSITIONING DEVICE

BACKGROUND OF THE INVENTION

The invention relates to a device for coupling a flying appliance which has landed to a positioning device. In addition, the invention relates to a corresponding method.

Devices of the type discussed here are used especially in coupling helicopters or similar flying appliances to positioning devices on ships or ship decks. Normally the positioning devices on the ship decks have appliances which can be operated manually. Grasping means on the positioning devices may be moved manually by an operator via a control system. The coupling devices mentioned have the disadvantage, however, that an operator always has to operate the control system and visually supervise the moving of the positioning and visually supervise the moving of the positioning device to the helicopter or the like. In addition, a device of this type has proved to be unsuitable and very difficult to handle, especially at sea.

The purpose underlying the invention, therefore, is to create a device which is easy to handle and an easily working method of coupling and securely locking the flying appliance on the positioning device.

SUMMARY OF THE INVENTION

A device in fulfilment of the invention has the features of claim 1. Recognition of a Landed helicopter or the like is realised through the optical device associated with at least one grasping means and a reflection means on the flying appliance, especially a helicopter, corresponding with the optical device. The optical device permits simple automated handling of the positioning device or of the grasping means as it is automatically led towards the landed helicopter or the like and coupled to same (docked) and locked. This reduces the time spent on coupling and locking. An operator to operate the control system or to make a visual check is thus superfluous.

In an advantageous development of the invention, the optical device may be moved in four decrees of freedom. In this way, the helicopter or another flying appliance can be located in any landing position by the optical device and correspondingly docked to the positioning device.

In a further development of the invention, the optical device has an oscillating mirror—a so-called "scanner". A light line can be generated by the vertical movement of the oscillating mirror, with the result that the "catching region" of the light beam detects a reflection point on the helicopter or the like.

The reflection means is disposed according to the invention inside a docking ball in the region of a main landing gear axle of the helicopter or the like. In this way, the accurate coupling of the grasping means to the helicopter or the like is guaranteed.

The device for fulfilling the purpose underlying the invention has, furthermore, the features of claim 12. Through the fact that a locking mechanism is allocated to at least one grasping means, secure and easily operable locking is created.

In an advantageous development of the invention, the locking mechanism is adapted to the contour of the docking ball disposed on the helicopter or the like.

Through the positive connection which can be thus achieved, the security of the locking between the flying appliance and the positioning device can be further increased.

Through the fact that at least one grasping means is automatically controlled by an optical device, the positioning device can be automatically, and independently of the landing position, led to the helicopter or the like and coupled to same. Expensive control by an operator can thus be avoided. In addition, the accuracy of the coupling process is increased by the use of the optical device.

Preferred developments of the invention arise from the secondary claims and the description.

BRIEF DESCRIPTION OF THE DRAWINGS

A preferred embodiment of the invention, given by way of example, is explained in greater detail below with the aid of the drawings. These show.

DESCRIPTION OF PREFERRED EMBODIMENTS

Figure 1:
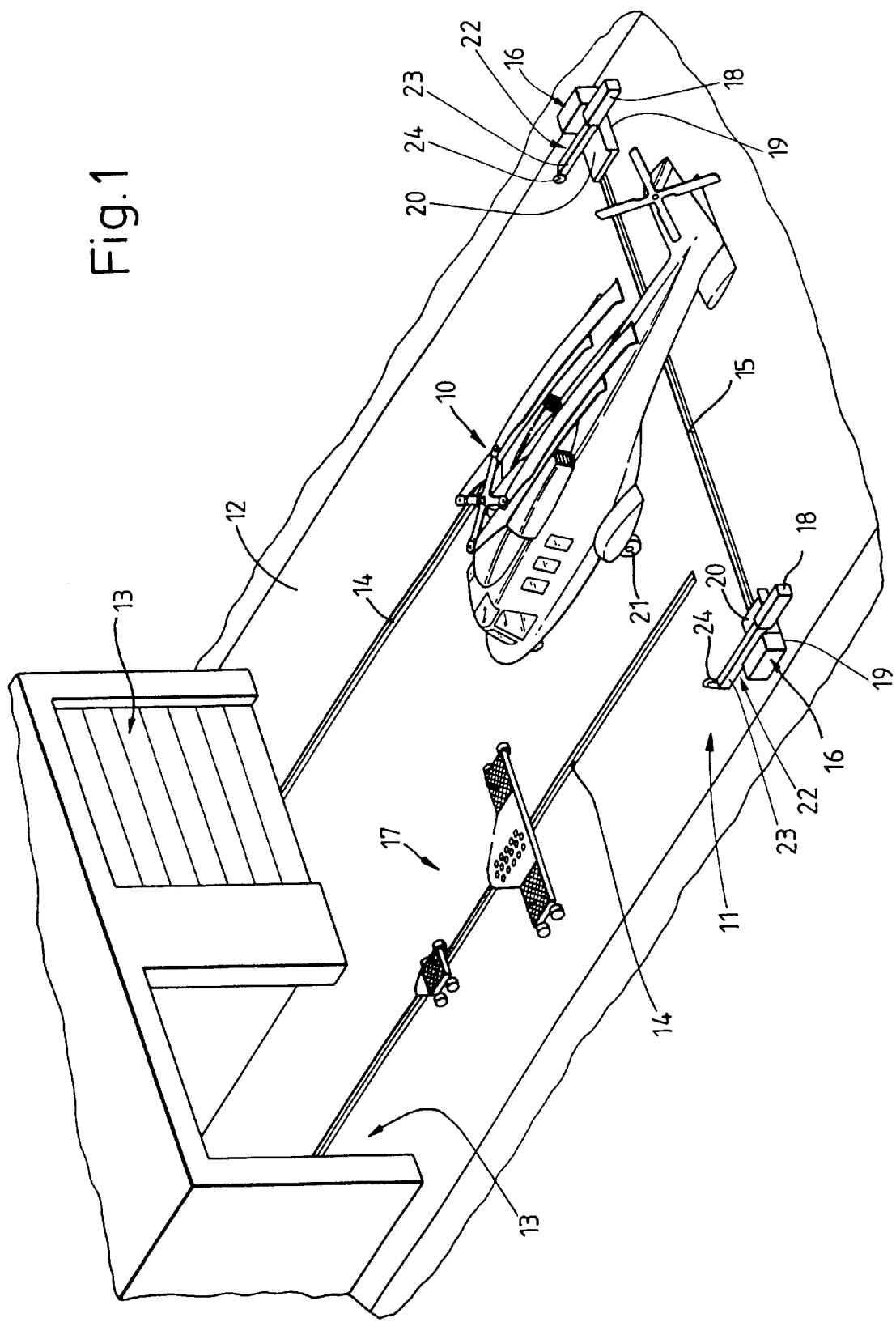
FIG. 1 a device for coupling a landed helicopter to a positioning device, in perspective view, FIGS. 2 and 3 two successive steps during the location and coupling of the positioning device to the helicopter, in each case in plan view, FIG. 4 a grasping means with an optical device according to detail IV in FIG. 2, in perspective view, FIG. 5 an arrangement of the elements of the optical device, in plan view, FIG. 6 an arrangement of the elements of the optical device in section VI according to FIG. 5, in side view, FIG. 7 a locking mechanism in section, in side view and FIG. 8 the locking mechanism according to FIG. 7 in section VIII.

The device shown in FIG. 1 for coupling a helicopter 10 to a positioning device 11 is located on board a ship which is only partially represented. A portion of the ship's deck serves as a platform 12 for landing the helicopter 10. In addition, in the embodiment, given by way of example and shown here, two hangars 13 are provided to accommodate helicopters 10.

The platform 12 shown has two longitudinal guideways 14 which run in the longitudinal direction of the ship and lead in each case into a hangar 13. A common transverse guideway 15, running transversely to the longitudinal direction of the ship is allocated to the ends of the longitudinal guideways pointing out of each hangar 13. The transverse guideway 15 thus serves both longitudinal guideways 14. The transverse guideway 15, which can also be configured as double rails, has two transverse positioning carriages 16. Along each longitudinal guideway 14 there is disposed movable longitudinal running gear 17, only the longitudinal running gear of one longitudinal guideway 14 being shown in the figures.

A grasping means 18 is arranged on each transverse positioning carriage 16, securely anchored. Four running gear carriages, not shown, are arranged on a base plate 19 of the transverse positioning carriages. The base plate 19 has, in addition, respectively one standing surface 20 on to which the main landing gear wheels 21 of the helicopter 10 may be pushed.

Figure 4:
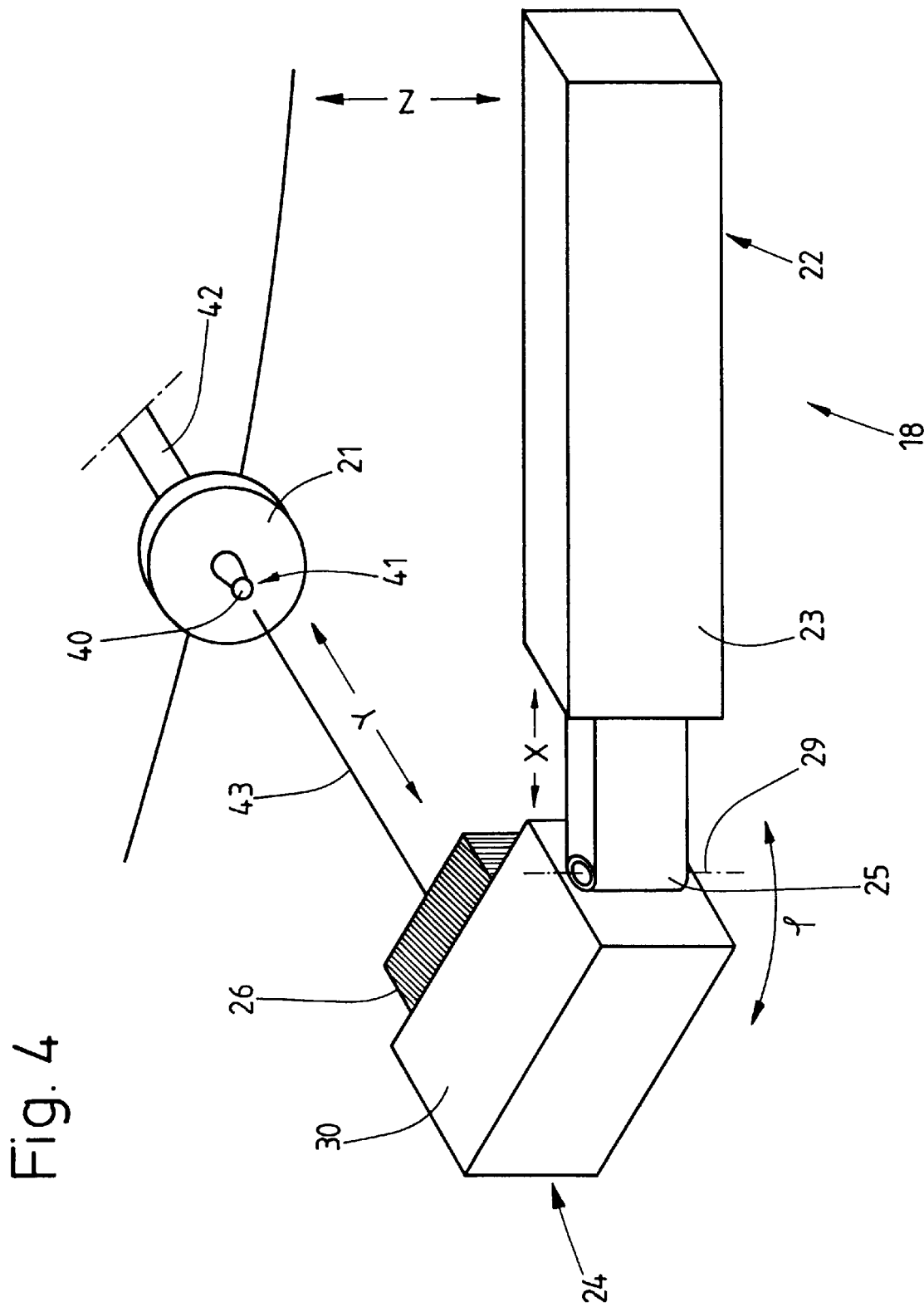
Figure 7:
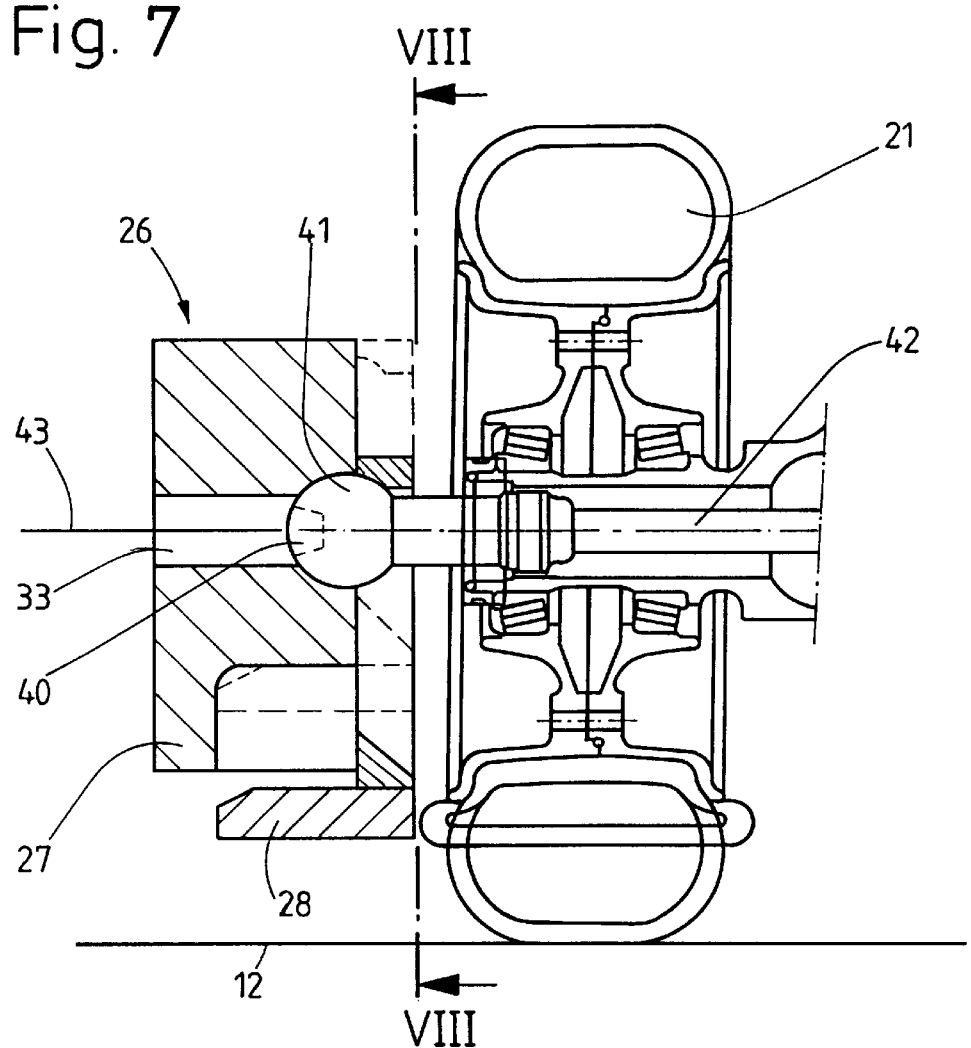
Figure 8:
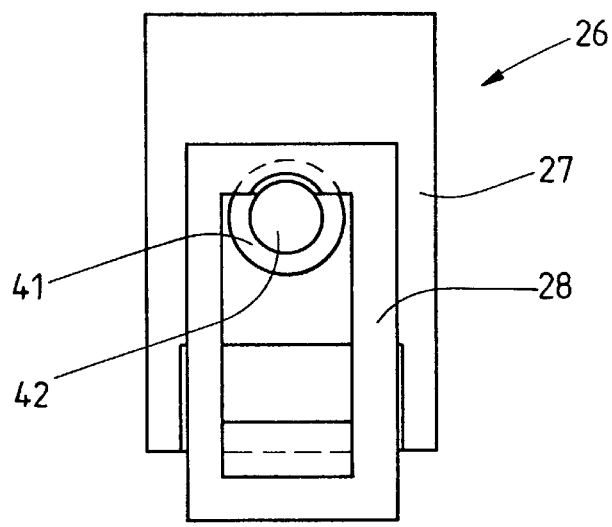

Each grasping means 18 has a telescopic device 22 consisting of a plurality of tubes, especially rectangular tubes, pushed inside one another. On one free end of an inner tube 23 there is located a telescopic head 24. The telescopic head 24 is disposed on the grasping means 18 so as to be swivellable around a joint 25 (FIG. 4). With one side of the telescopic head 24 there is associated a locking mechanism 26 which consists essentially of a docking block 27 and a slidable latch 28 (FIGS. 7 and 8). The docking block 27 forms the linking point on the helicopter 10. The latch 28 secures the grasping means 18 on the two longitudinal sides of the helicopter 10. In order to be able to grasp and stop a landed helicopter 10 regardless of its landing position, the grasping means 18 may be moved in four degrees of freedom, namely in X-, Y- and Z-directions as well as round an axis of rotation 29 (angle φ) of the joint 25.

On the other side, the telescopic head 24 has an optical device 30 as part of an image-processing system 31. The optical device 30 is partially arranged in a protective housing 32. The housing 32 is mounted on the telescopic head 24 on the side of the docking block 27 turned away from the helicopter. A through hole in the docking block 27 forms an optical channel 33 between the optical device 30 of the image-processing system 31 and the deck scenery through which the beam from the optical device 30 may pass.

Figure 5:
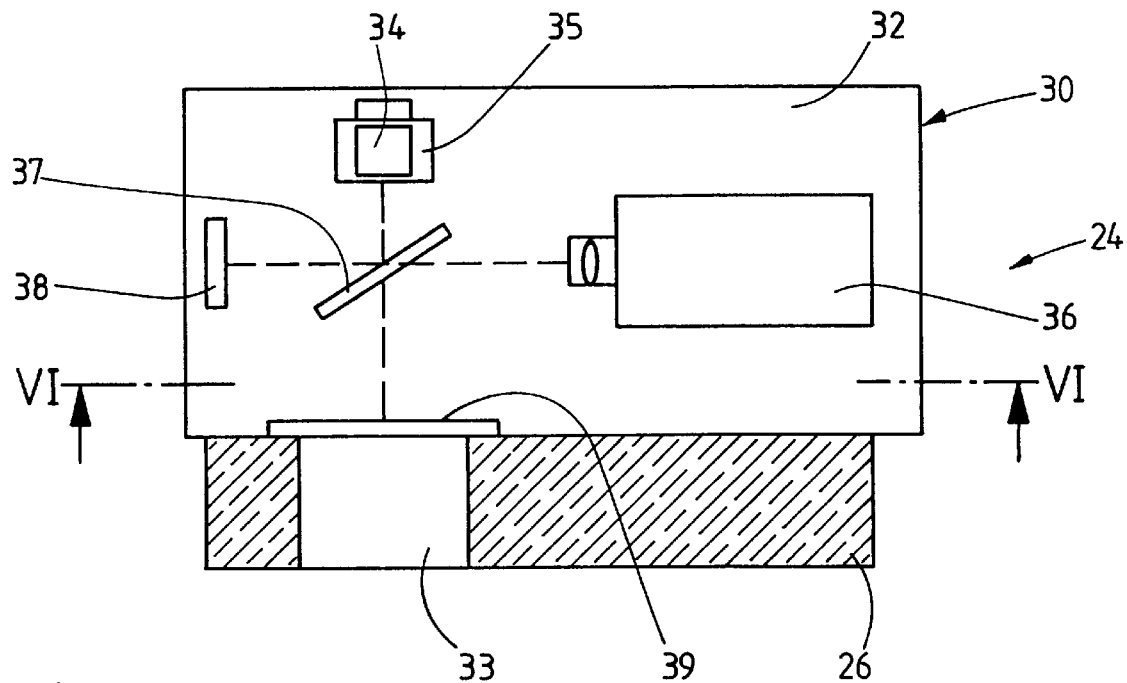
Figure 6:
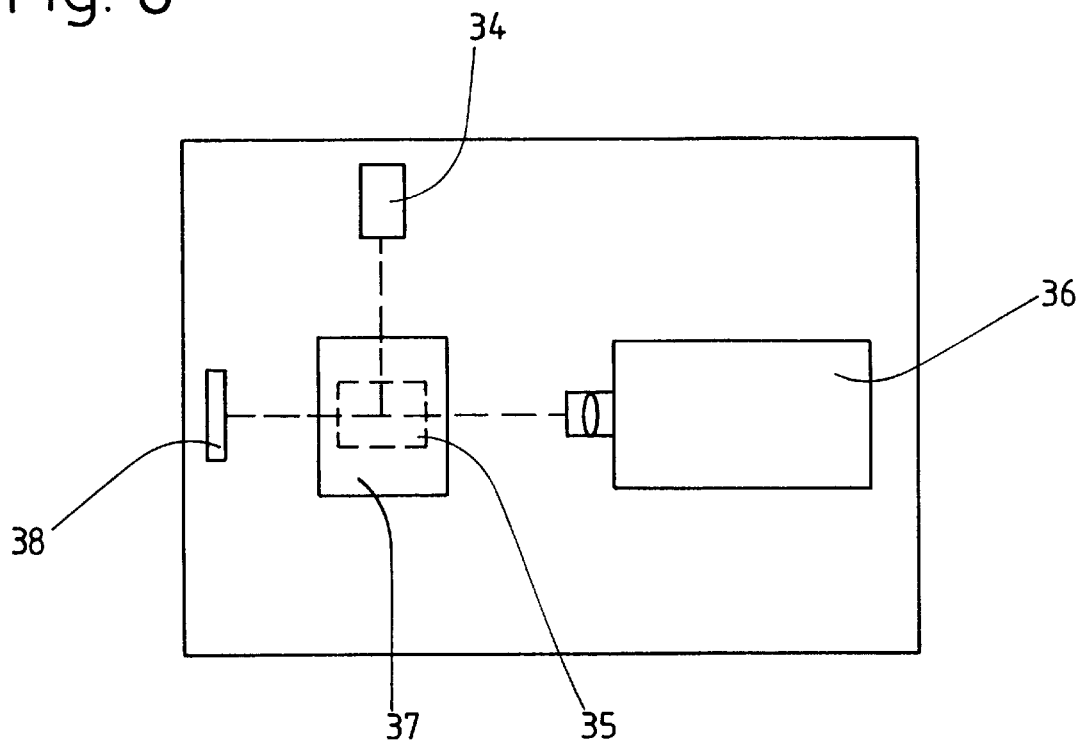

FIGS. 5 and 6 show the structure and the elements of the optical device 30. The optical device 30 consists of the following components: a laser diode module 34, an oscillating mirror 35 (scanner), a preferably square PSD camera 36, a semipermeable mirror 37, a linear PSD element 38 as well as a front glass pane 39 in the region of the channel 33 and located on the side facing the docking block 27. A further component, namely a reflection means of the optical device 30, is located on the helicopter 10. The reflection means, configured as a triple prism 40, is disposed inside a docking ball 41 on the two opposite sides of a main landing gear axle 42, preferably on each main landing gear wheel 21 of the helicopter 10. The docking ball 41 forms the linking point at the helicopter side for the grasping means 18. A scanner drive, not shown, for the oscillating mirror 35 and a processor, likewise not shown, for receiving and processing the detected data form, together with optical device 30, the complete image-processing system 31. Each grasping means 18 has an optical device 30. Corresponding thereto, each helicopter 10 is provided with a corresponding number of reflection means, preferably on each main landing gear wheel 21.

The functioning principle of the optical device 30 is described below with the aid of FIGS. 5 and 6. The optical path begins at the laser diode module 34 which generates a point-shaped light beam 43 on a wavelength of approximately 680 nm. Via the mirror 35 (scanner), oscillating in a vertical direction, the light beam 43 is passed through the semipermeable mirror 37 and the front glass pane 39 through the channel 33 into the deck scenery. Through the vertical movement of the mirror 35 there appears the impression of a light line standing vertical in space. If, in the course of the search process, this light line hits the triple prism 40 located in the main landing gear axle 42, it is then reflected from there, mirrored on the optical axis of the triple prism 40, parallel to the entry direction. The reflected light beam 43 then enters the housing 32 again through the front glass pane 39. The light beam 43 is deflected to the side on the semipermeable mirror 37 and hits the PSD camera 36. Two-dimensional measurement is possible because of the square design of the PSD camera 36. This arrangement makes it possible to determine the place of deposit of the reflected light beam 43 relative to the middle of the sensor in a horizontal and in a vertical direction. The optical device 30 is so adjusted that the light beam 43 lies in the centre point of the channel 32, and thus the measurement detected is equal to the divergence between the main landing gear axle 42 and the axis of the grasping means An image-processing system processor, not shown, converts the raw data into formatted data and sends it directly via an integrated field bus interface to a higher order central processor. There, these signals are then switched to the control circuits as dynamic actuating signals.

The control of all the moving members of the positioning device 11, including the grasping means 18 therefore, is effected via servo hydraulic regulating components. The movement states of the individual axles are detected via associated position sensors. The sensor technology consists of path and angle measurement transmitters for all the axles of the positioning device 11, especially a path-measuring system associated with the grasping means 18 and an azimuth transmitter disposed inside the hollowed-out joint 25, of inductive proximity switches to detect digital position states and of the image-processing system 31. The sensors have been designed specifically for operation on the above-mentioned field bus interface. The detection of the movement states takes place with digital sensors using unit-distance code, such that there is maximum immunity to interference on the whole data acquisition path.

According to FIG. 7, the telescopic head 24 has in addition the locking mechanism 26. The locking mechanism 26 is a component of the swivel system which may be moved around the joint 25. The latch 28 may be moved in a guideway via integrated hydraulic cylinders, not shown, especially to open and close the latch 28. The docking block 27 and the latch 28 are both adapted to the contour of the docking ball 41 located on the helicopter wheel. Secure fixing is achieved through the positive, detachable connection, on the so-called ball/ball socket principle. All the forces imitated by the helicopter and ship movements as well as the force components resulting from the weight are passed into the grasping means 18 via the docking balls 41. The positive connection also guarantees an even introduction of force into the grasping means 18. If the grasping means 18 is in the correct position, i.e. if the docking ball 41 is bedded into the docking block 27, the hydraulic cylinder moves the latch 28 into the locked position in such a way that the docking ball 41 is secured against any horizontal movement out of the docking block 27.

A coupling process with the image-processing system 31 on the grasping means 18 takes place as follows:

Once the image-processing systems 31 hare been started, the grasping means 18 are first moved in direction Y. Simultaneously with the Y-axes, the Z-axes are raised to such an extent that the triple prism 40 appears on the upper edge of the image in the normal state of the main landing gear wheels 21. The Z measurement is thus produced from the data, typical for the helicopter, which are known to the installation management system program through a generally single operator entry. Then the X-axes are telescoped until contact is made with the triple prism 40. When this contact occurs, the X speed is reduced and the desired values of the Z- and X-regulators are switched over to the actuating signals transmitted from the image-processing system 31 together with the instantaneous position.

The X- and Y-regulator desired values of the image-processing system 31 remain set at this position, with the result that dynamic movements are permanently adjusted out. Now the Y-axes are moved closer to the object. This step is possible once the Z-axes have been previously centered. When the Y-positions of the grasping means 18 have been reached, the X-positions are determined as a mean value over a period of seconds. With the aid of these values, the helicopter landing angle and the position of the helicopter 10 in the X direction can be calculated. Then, a further movement in the Y-direction closer to the triple prism 40 takes place. Once the new Y-setting has been reached, the triple prisms 40 are located in the centre of the image area. By moving a distance in the X-direction of approx. 300 mm, an actuating signal occurs in the image-processing system 31, which, depending on the distance from the triple prism 40, would lead to a loss of contact. In order to keep the triple prisms 40 centered, the actuating signals of the image-processing system 31 are switched in this phase over to alpha regulators of the grasping means 18. This causes the swivel-heads, namely the telescopic heads 24, to follow the movement during the X-movement. After movement in the X-direction, the angles of the telescopic heads 24 are measured over an averaging period. With the aid of the data now available, the distance of the image-processing system 31 from the triple prism 40 can be determined. If there is insufficient proximity to the triple prism 40, the triangulations can be repeated at a shorter distance from the triple prism 40.

Now the desired values of all the regulators are so calculated that the telescopic heads 24 are positioned centred in the main running gear axle 42 at a distance of approx. 250 mm from the triple prisms 40. All the axles are moved simultaneously. Once the end position has been reached, the alpha regulators are frozen at the landing position with the result that loads can be taken over via the telescopic heads 24 but no more movements carried out. The calculated Y-deviations from the Y-regulators are now travelled. Since the Y-movement automatically results in centering deviations of the optical devices 30, and the latter in turn impinge on the X-regulators, the grasping means 18 travel with three active axes on a straight line towards the triple prisms 40. In order to move the docking balls 41 secured and under slight pressure into the docking blocks 27, the Y-regulators are given slightly exaggerated desired values.

The moving processes for all the three active axes end immediately with the response of a docking proximity switch. The response of a switch effects the freezing of the regulator desired value at the actual values at the response time. Finally, the locking is effected by the latch 28. The coupling process is thus completed and the image-processing systems 31 are halted.

The coupling process described takes place on each main landing gear wheel 21 of the helicopter 10, it being also possible for the coupling processes of the grasping means 18 disposed on both sides of the helicopter 10 to take place at the same time.

After coupling, the helicopter 10 is aligned and pushed on to the standing surfaces 20 of the transverse positioning carriage 16. Finally, the helicopter 10 is manoeuvred in known fashion and led into one of the hangars 13.

To start the helicopter 10, it is driven by means of the longitudinal running gear 17 out of the hangar again on to the platform 12.

The invention can also be used on other flying appliances apart from the helicopters mentioned.

What is claimed is:

1. A coupling device for coupling a landed flying appliance to a positioning device, said coupling device comprising:
    a movable grasping mechanism having a first docking means which comprises an optical device and which has an optical channel through which at least one beam of light may pass; and
    a second docking means which is disposed on the flying appliance and which includes light-reflection means,
    at least one part of the channel also serving to receive at least one part of said second docking means on the flying appliance.

2. The coupling device according to claim 1, wherein the optical device (30) is part of an image-processing system (31).

3. The coupling device according to claim 1, wherein a telescopic head (24) including the optical device (30) is mounted on the grasping mechanism (18).

4. The coupling device according to claim 3, wherein the telescopic head (24) is swivelably mounted on the grasping mechanism (18).

5. The coupling device according to claim 1, wherein the optical device (30) comprises a vertically oscillating scanning mirror (53) to generate a light line.

6. The coupling device according to claim 1, wherein said second docking means is on a first main landing wheel (21) of the flying appliance, and the second docking means is configured as a docking ball (41) which has a configuration corresponding to that of said channel (33) in said first docking means on the grasping means (18).

7. The coupling device according to claim 6, wherein the reflection means is located inside the docking ball (41) in a region of an axle of the main landing wheel of the flying appliance, the docking ball (41) forming a coupling point for the grasping mechanism (18).

8. The coupling device according to claim 1, wherein the grasping mechanism (18) is movable in at least four degrees of freedom.

9. The coupling device according to claim 3, wherein the grasping mechanism (18) and the telescopic head (24) are mounted on a positioning carriage (16) which is movable transversely to a longitudinal dimension of the landed flying appliance so that the optical device (30) may be moved in the transverse direction.

10. The coupling device according to claim 9, wherein the optical device (30) is movable, together with the grasping mechanism (18), laterally to the transverse positioning carriage (16).

11. The coupling device according to claim 1, wherein the grasping mechanism comprises at least one path-measuring system and one azimuth transmitter.

12. The coupling device according to claim 6, further comprising a locking mechanism (26) on said grasping mechanism (18) to fix the flying appliance to the positioning device (11).

13. The coupling device according to claim 12, wherein the locking mechanism (26) comprises a docking block (27) and a locking bar.

14. The coupling device according to claim 13, wherein the docking block (27) and the locking bar form a latch (28), and are adapted to a contour of said locking ball (41) on the flying appliance.

15. The coupling device according to claim 6, wherein said movable grasping mechanism and said second docking means form a first set of couples associated with said first main landing wheel on one side of the flying appliance, said coupling device further comprising a second set of couplers, the same as said first set, associated with a second main landing wheel on an opposite side of said flying appliance.

16. The coupling device according to claim 14, wherein the latch (28) is displaceable in a guide.

17. The coupling device according to claim 6, wherein said reflection means is a triple prism (40).

18. A method for coupling a landed flying appliance to a positioning device having a movable grasping mechanism including a first docking means having an optical device, a second docking means being located on the flying appliance and having a reflection means, said method comprising the steps of:
    causing the optical device to generate at least one light beam;
    passing the light beam through a channel in the first docking means to locate the reflection means on the flying appliance;

then positioning the grasping mechanism by means of control systems to couple the first and second docking means together; and receiving at least one part of said second docking means on the flying appliance in the channel of said first docking means.

19. The method according to claim 18, further comprising the step of causing the light beam (43) to impinge upon an oscillating mirror (35) in the optical device to generate a light line.

20. The method according to claim 18, further comprising the step of processing data detected by the optical device (30) in a processor in such a way that the processor guides the grasping mechanism to a coupling position of the first and second docking means.

21. The method according to claim 18, further comprising the step of moving the grasping mechanism (18) in a plurality of degrees of freedom.

22. The method according to claim 20, further comprising the step of providing a locking mechanism (26) for automatically locking together the first and second docking means after the coupling thereof.

* * * * *